US007613677B2

(12) United States Patent
Kolberg et al.

(10) Patent No.: US 7,613,677 B2
(45) Date of Patent: Nov. 3, 2009

(54) METHOD AND SYSTEM FOR PROVIDING INDICIA FOR STRUCTURE FUNCTION CLAIMS

(75) Inventors: Loretta W. Kolberg, Chanhassen, MN (US); Kathryn L. Wiemer, Minnetonka, MN (US)

(73) Assignee: General Mills, Inc., Minneapolis, MN (US)

( * ) Notice: Subject to any disclaimer, the term of this patent is extended or adjusted under 35 U.S.C. 154(b) by 1554 days.

(21) Appl. No.: 10/162,323

(22) Filed: Jun. 3, 2002

(65) Prior Publication Data

US 2003/0225762 A1 Dec. 4, 2003

(51) Int. Cl.
G06F 7/00 (2006.01)
G06F 17/30 (2006.01)
A22C 13/00 (2006.01)
A22C 17/10 (2006.01)

(52) U.S. Cl. ............................................. 707/1; 426/87
(58) Field of Classification Search ................. 707/100, 707/101, 102, 103 R, 104.1, 1; 426/87
See application file for complete search history.

(56) References Cited

U.S. PATENT DOCUMENTS

| 4,180,204 | A  | * | 12/1979 | Koenig et al. ............... 235/385 |
| 4,780,599 | A  | * | 10/1988 | Baus ......................... 235/383 |
| 6,341,287 | B1 | * | 1/2002  | Sziklai et al. ............... 707/102 |
| 6,478,736 | B1 | * | 11/2002 | Mault ......................... 600/300 |
| 6,558,718 | B1 | * | 5/2003  | Evenson et al. .............. 426/72 |
| 6,696,924 | B1 | * | 2/2004  | Socinski ..................... 700/213 |
| 2003/0009367 | A1 | * | 1/2003 | Morrison ...................... 705/9 |
| 2003/0083925 | A1 | * | 5/2003 | Weaver et al. ................ 705/10 |
| 2003/0159857 | A1 | * | 8/2003 | Lin et al. ................... 177/25.13 |
| 2005/0010476 | A1 | * | 1/2005 | Combs ....................... 705/14 |
| 2005/0059137 | A1 | * | 3/2005 | Lee ........................ 435/287.2 |
| 2005/0177397 | A1 | * | 8/2005 | Kane ........................... 705/2 |
| 2006/0247968 | A1 | * | 11/2006 | Kadry ........................ 705/14 |

OTHER PUBLICATIONS

Paula Kurtzweil, US Food and Drug Administration, FDA Consumer, "Food Label Close-Up", Apr. 1994, http://www.fda.gov/fdac/reprints/closeup.html.*
Carol J. Haggans, Karen S. Regan, Lynda M. Brown, Chunling Wang, Jim Krebs-Smith, Paul M. Coates, Christine A. Swanson, Computer Access to Research on Dietary Supplements: A Database of Federally Funded Dietary Supplement Research, Journal of Nutrition, Apr. 15, 2005.*
USFDA, Structure/Function Claims Small Entity Compliance Guide, Centers for Food Safety and Applied Nutrition, Jan. 9, 2002.*

* cited by examiner

*Primary Examiner*—John Breene
*Assistant Examiner*—Joshua Bullock
(74) *Attorney, Agent, or Firm*—Everett G. Diederiks; John A. O'Toole

(57) ABSTRACT

The present invention relates to a method and system for providing indicia for structure function claims for consumer products, including dietary supplements, consumable food products, health and beauty aids. More specifically, the system employs a series of data sets that correlates a particular nutrient, component or ingredient to one or more related structure function claims. Once the correlation is made, the system then provides approved or permitted structure function claim indicia that can be printed on a package or advertising to communicate the desired result of matching a product to a functional human health benefit.

21 Claims, 4 Drawing Sheets

| Class | Nutrient/Component/Ingredient | Health Issue | Health Issue | Health Issue | Health Issue | Health Issue |
|---|---|---|---|---|---|---|
| Vitamin | Antioxidant Vatimins | Immune | Play an important role in supporting the body's natural defense. | Packaging | GRAS | ABC |
| Vitamin | B Complex Vitamins | Energy Metabolism | Important to the activity of many enzymes and in energy metabolism. | Advertising | GRAS | ABC |
| Vitamin | Folic Acid | Matabolism | Important in formation of red blood cells; necessary for the formation of some amino acids. | Packaging | GRAS | ABC |
| Other | Beta Glucan | Heart Health Cholesterol | May help to maintain a cholesteral healthy cardiovascular system; useful in the maintenance, regulation of blood cholesterol which is within normal limits; as part of a heart-healthy diet; the soluble fiber in Cheerios® can reduce your cholesterol. | Packaging/ Advertising | GRAS | ABC |
| Mineral | Calcium | Bone Development Dental | Important/critical to growing strong, healthy bones; critical for bone mineralization; maintenance of growing bone tooth development. | Packaging | GRAS | ABC |

Fig. 4

METHOD AND SYSTEM FOR PROVIDING INDICIA FOR STRUCTURE FUNCTION CLAIMS

CROSS-REFERENCES TO RELATED APPLICATIONS

None

BACKGROUND OF THE INVENTION

The present invention relates to a method and system for providing indicia for structure function claims. More particularly, the invention relates to the use of such a system for providing information for consumable food products, dietary supplements, health and beauty aids and other consumer products.

More specifically, the system employs a series of data sets that correlates a particular component, nutrient and/or ingredient to one or more related scientifically accepted structure function claims as it pertains to a particular health issue or other health benefit. Once the correlation is made, the system then provides an approved or permitted structure function claim indicia that can be printed or imaged on a package or submitted in advertising to communicate the desired result of matching a consumer product having such nutrient component or ingredient to a functional health benefit or human health issue.

Currently, there is a desire for the manufacturers, producers and distributors of consumer products to advertise and mark the product packaging with beneficial structure function claims, touting one or more of the nutrients, components and/or ingredients contained within the product as having a perceived health benefit to the consumer. From a marketing, manufacturing and sales point, the ability to label product offerings with approved or permitted functional wording provides an additional commercial benefit to the manufacturer and distributor in creating new product offerings that meet consumer demands for products that provide a benefit to the consumer in maintaining good health.

The problem associated with the foregoing strategy, in essence to educate consumers about the benefit of certain items, is the difficulty in keeping track of current research findings, clinical studies and other materials relating to certain properties or benefits of nutrients, ingredients and other components and their interaction in contributing to human well-being. In addition, long held beliefs of certain components can change and regulatory bodies such as the Food and Drug Administration (FDA) may mandate the handling of such components differently or even require the removal of certain components from consumer food products altogether.

At any given time, there are numerous clinical studies going on, and other research projects and related efforts. All of these endeavors create a plethora of related publications and articles that must be understood and communicated as part of the product offering when necessary.

Manufacturers and producers are also required to retain information relevant to the current regulatory status of each nutrient, component and or ingredient. In addition to this, each such nutrient, component or ingredient typically has a scope of permissible structure functions claim indicia that a manufacturer may provide in connection with such product including such nutrient, component and or ingredient in its products. The product labeling is usually provided on the packaging for the product, but it can be provided in collateral material as well.

Such regulatory status may include GRAS (Generally Recognized As Safe) items which may be done by the manufacturer or component producer itself but only for certain applications or uses of the component, nutrient or ingredient. For example, a particular component may be GRAS approved for use as a food coloring, but not for use in communicating the benefit of preventing macular degeneration in humans. Or the use of a nutrient may be approved for use in promoting bone health but not approved for use related to weight management or the treatment of obesity.

Failure to use acceptable or approved wording in connection with a particular nutrient, component and or ingredient or misstating the value or benefit of a specific nutrient, component and/or ingredient can lead the manufacturer or producer to be subject to monetary fines, penalties and recalls, not to mention potential public embarrassment and loss of perception and/or standing due to undesirable advertising relating to certain product recalls. The unfortunate result of such action can create undesirable loss in market share and of course overall loss in sales.

Presently, the only manner by which this information can be tracked or traced is through conducting specific, singular research concerning the effects or benefits of a specific nutrient, component or ingredient. Then additional research must be done to determine the type or permissible structure function claim that can be associated with the particular nutrient, component or ingredient. This second tier of information is obtained from the FDA. Complicating the matter further are the labeling requirements that relate to the size and placement of the structure function claim indicia on the packaging or in the advertising related to the product.

Such prior art techniques are often time consuming and labor intensive as the individual charged with the task must sort through significant amounts of data and seek details from various sources. Often, without knowing, such procedures can be duplicative of recent efforts of others. Moreover, once such structure function claims are provided with a product, there is often no manner to track which products carry which messages or claims. As such, maintaining and providing information which is not misleading can be problematic.

What is therefore needed is a method and system to accurately track and update data related to the nutritional, health or other benefits of macronutrients, micronutrients and other nutrients, components and/or ingredients as well as the ability to provide such information in a "just in time" format so as to avoid slowing down production schedules or marketing campaigns, thereby allowing manufacturers and consumers the ability to quickly capitalize on a newly discovered or other known benefits of the nutrient, component and or ingredient.

SUMMARY OF THE PRESENT INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In a preferred embodiment of the present invention, a system for providing approved indicia for structure function claims is provided and includes a database having at least first through third data sets. Each of the data sets contains information that is distinct from each of the other data sets. The first data set contains a listing of items that include nutrients, components and ingredients. Those items are collected and formed together to create a catalog. The nutrient, component and ingredient catalog includes at least one macronutrient and at least one micronutrient. A second data set contains a listing of human health related issues. The third data set contains an approved grouping of structure function claims indicia that is relevant to each item in the ingredient catalog and the listing of human health related issues.

The system further includes a first input module that is capable of receiving data from at least one of the data sets contained in a central database or data network based on information selected from one of the first through third data sets. A first output module is used to display information received from the data sets. The information that is received from the data sets is then used to produce an integrated message, which includes the structure function claim, the items in the catalog all of which are linked to the listing of health related issues.

In a further embodiment of the present invention a method for providing indicia for structure function claims for food products is described. The method includes a first step of collecting a listing of items that consists of nutrients, components and ingredients. That listing comprises at least one macronutrient and at least one micronutrient. Once collected that listing information is stored in a first data set. Next, a grouping of human related health issues is provided and stored in a second data set that is distinct from the first data set. Structure function claims indicia is then identified and arranged in a third data set. The structure function claims are related to at least one item in the first data set and one human related health issues in the second data set. By creating a query in the first through third data sets, information is generated that is useful in informing a consumer of a benefit of one of the items in the listing. Once that information has been received, printing is requested which results in an identification of one item from the listing, information about a human health related issue and the relevant structure function indicia such that the beneficial relationship between consumption of the item from the listing and the maintenance of human health is identified.

In a still further embodiment of the present invention, a system for controlling the production of structure function claims is provided. The system comprises a data network connected to at least a first data base and a first input module and a first output module. The first database has at least first through third data sets. The system receives information from at least one of the first through third data sets. The first data set has a listing of nutrients and components. The second data set has a grouping of human health related issues and the third data set has an arrangement of structure function claims that are related to the listing of nutrients and components and the grouping of health claims. The system selects at least one of the health related issues and at least one of the listing of nutrients and components related to the health related issue. Then the system through the first output device generates a structure function claim relevant to the listing and the health related issue.

The present invention is now illustrated in greater detail by way of the following examples, but it should be understood that the present invention is not to be construed as being limited thereto.

BRIEF DESCRIPTION OF THE DRAWINGS

The objects and advantages of this invention, will be more completely understood and appreciated by referring to the following more detailed description of the presently preferred exemplary embodiments of the invention in conjunction with the accompanying drawings, of which:

FIG. 4 is a representative view of a predetermined output display created by the system of the present invention.

DETAILED DESCRIPTION OF THE INVENTION

The present invention is now illustrated in greater detail by way of the following detailed description, but it should be understood that the present invention is not to be construed as being limited thereto.

Figure 1:
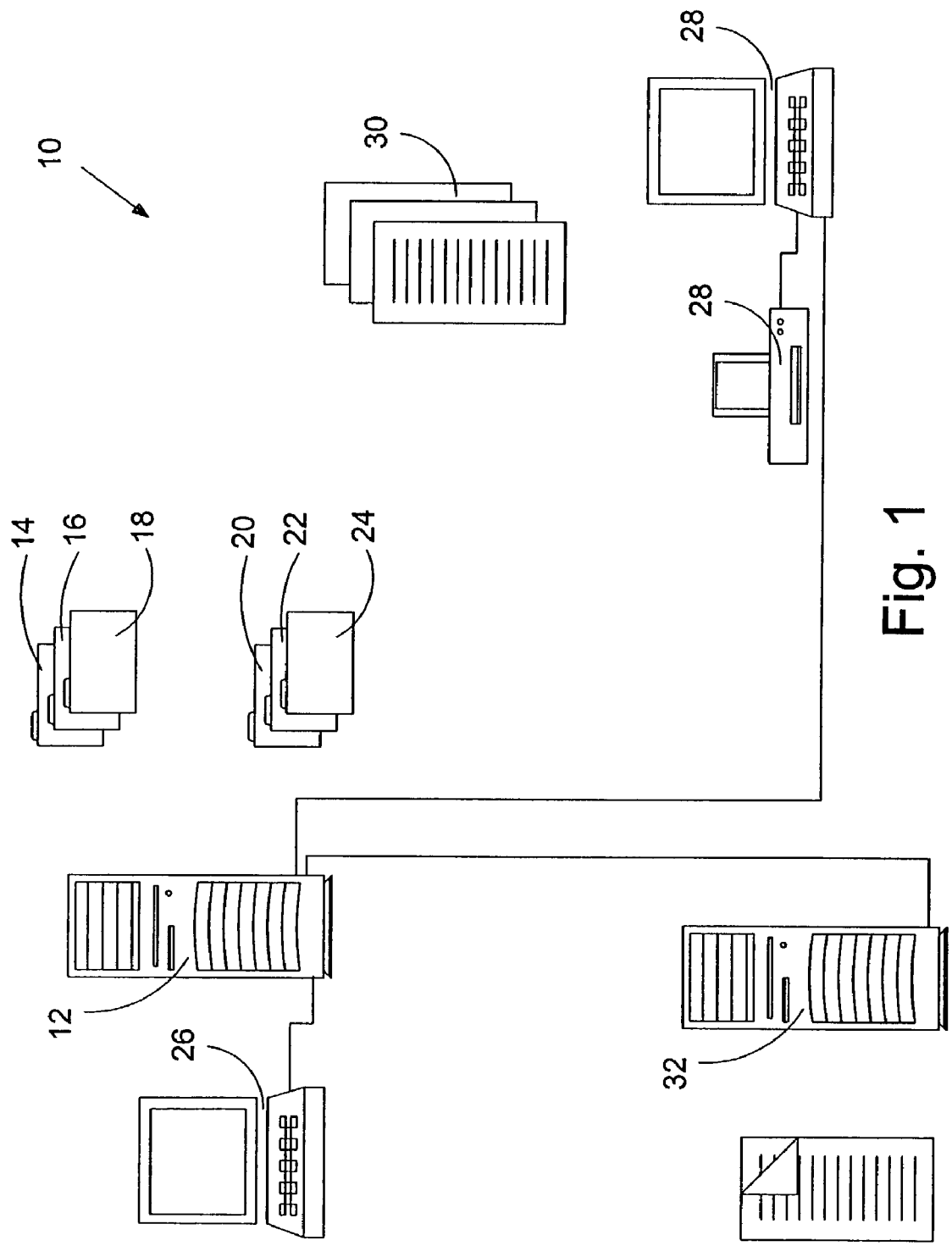
FIG. 1 is a schematic representation of the system.

The present invention includes a system, generally depicted as 10 in FIG. 1. The system 10 has a central database 12 having at least first through third data sets, 14, 16 and 18, respectively. As depicted in FIG. 1, the database 12 has additional data sets 20, 22 and 24, which contain different and distinct information from that of data sets 14, 16 and 18. The database 12 is connected to an input module 28 which may be a desktop computer or other means suitable for entering and retrieving data or information. The input module 26 is connected to at least one output module 28. The output module 28 is used to render and or display the information gathered from the various data sets 14, 16, 18, 20, 22 and 24 and is depicted as numeral 30. The output module 28 can be a printer, a visual display or other device which can be used to illustrate the results obtained from the data sets.

The output 30 can be printed information such as for a newsletter, newspaper, product package, magazine, advertisement or the like or it may be material scripted for use with an audiovisual device such as a television commercial. In addition, the scripted output 30 may also be read as a script for radio or part of a presentation to a trade association, conference or the like.

The system 10 may also be connected to a remote database 32 over the Internet or other conventional means. The remote database 32 can provide commercial information such as product market share, demographic information as to the type of consumer to whom the product is applicable, seasonal purchasing habits, geographical information and other useful information in preparing targeted marketing campaigns. The remote database may also be a listing of current regulatory status for the ingredients, nutrients or components.

Figure 2:
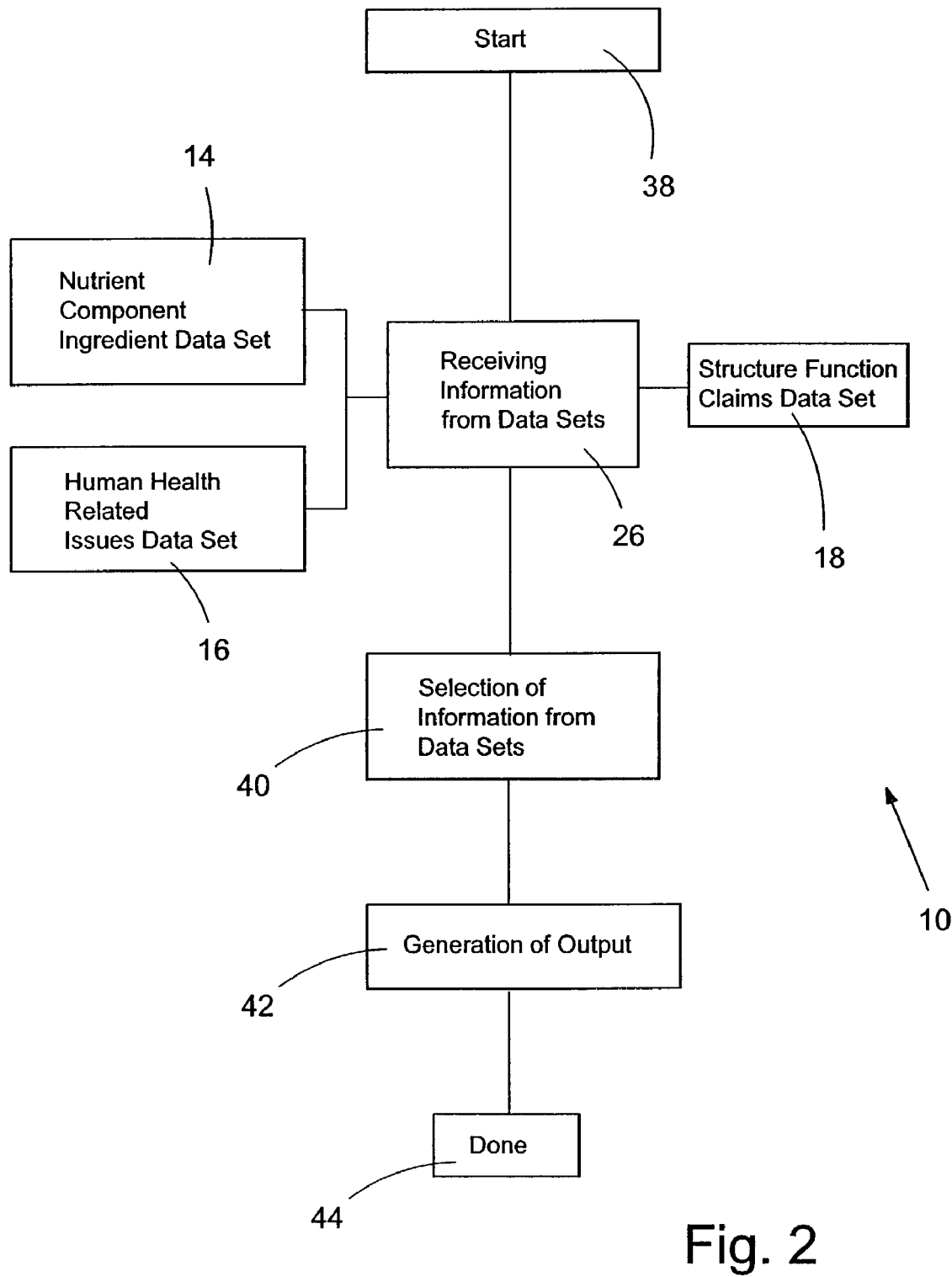
FIG. 2 is block diagram representing the operation of the system.

Turning now to FIG. 2 a block diagram is provided and shows the operation of the system 10. The input device 26, illustrated in FIG. 1, receives information from one or more data sets and for the purposes of this illustration only three data sets 14, 16 and 18 are provided and relate to the nutrition, component and ingredient data set 14, the human health related data set 16 and the structure function claims 18. Once the information is received as a result of a particular query, the relevant information is then extracted and shown in step 40. The information is then arranged and submitted to the output device in step 42 to create the desired linking between the individual items from the data sets.

An exemplary query as provided by the system and method of the present invention is as follows.

| Nutrient/Component Ingredient | Health Issue | Structure Function Indicia |
|---|---|---|
| Beta Glucan | Heart Disease; Cholesterol | May help to maintain a Cholesterol healthy Cardiovascular system; (2) useful in the maintenance/regulation of blood cholesterol which is within normal limits; (3) as part of a |

| Nutrient/Component Ingredient | Health Issue | Structure Function Indicia |
|---|---|---|
| | | heart-healthy diet; (4) the soluble fiber in Cheerios ® can reduce your cholesterol. |
| B Complex Vitamins | Energy Metabolism | Important to the activity of many enzymes and in energy metabolism. |
| Calcium | Bone Development | Important/critical to growing strong and healthy bones. |

The foregoing example sets forth a summary of the type of representative information, which might be found in data sets 14, 16 and 18, namely the nutrient, component or ingredient information in data set 14, the human related health issue in data set 16 and the permissible structure function claims indicia of data set 18.

The above example also illustrates that more than one health issue can be associated with a particular component, nutrient or ingredient. As the number of permutations increase, the complexity of maintaining the information becomes more and more unwieldy making individual investigations considerably more time consuming. Hence the need for the method and system of the present invention.

As indicated previously, additional data sets may be provided in accordance with the system 10 of the present invention. Such data set might include a classification of the type of nutrient, component or ingredient, current regulatory status, supporting reference material. For example, linked to the data sets provided above, the additional data sets 20, 22 and 24 may be as follows.

| Classification | Reference Notes | Regulatory Status |
|---|---|---|
| Other | ABC | GRAS |
| Vitamin | ABC | GRAS |
| Mineral | ABC | GRAS |

The term "other" is used in the above example as a miscellaneous class representation as Beta Glucan, a dietary fiber, is not a recognized member of another class such as a vitamin or mineral. Under "reference notes" the applicant has simply provided a generic listing of a reference source ("ABC"). Regulatory status for Beta Glucan is "GRAS" or Generally Recognized as Safe and was obtained via a producer or supplier of the material rather than an approval of a governmental agency.

Additional data sets and databases may also be present and utilized by the present method and system of the invention. For example, a remotely accessible database 32, as illustrated in FIG. 1, may provide other useful information which may be important in collecting data on other products in the marketplace, such as market share, whether there are competitive products and the marking which competitors are using on products which may contain the same nutrient, component or ingredient.

| Geographic | Market Share | Competitive Products |
|---|---|---|
| All US | 26% | Yes |
| Northeast | 14% | Yes |
| Southwest | 22% | Yes |

The foregoing is exemplary only and is not intended to display actual competitive data. The columns are simply provided as an illustration of additional data sets that may be utilized by the present invention.

Another grouping of internally and externally available data sets and database may occur as in the following example.

| Used On Packaging | Used In Advertising | Not In Use |
|---|---|---|
| RTE Cereal Boxes (3) (4) | Television, Print and Radio, Internet | Not Applicable |
| RTE Meal | Packaging | Yes |
| Bread | Packaging | Yes |

It is important from a manufacturing and distribution standpoint to continue to track whether a particular structure function claim is being used in connection with a product offering. New research can prove additional benefits of the component, nutrient or ingredient and as such, quick identification of products having such items would need to be identified so that the wording and imaged indicia could be updated promptly.

In addition, where it is subsequently learned that the structure function claim becomes the subject of a dispute or can no longer be substantiated and is removed from an approved listing of acceptable phraseology, the manufacturer and distributor need to promptly identify and change the claim to something more appropriate as well as be able to recall any products which may contain the objectionable wording.

As used herein, the term ingredients, components and nutrients is intended to include items that are included in consumable food products, including but not limited to macronutrients, micronutrients (vitamins and minerals), sugars, fat content, carbohydrates, conventional ingredients such as flour, water, salt, preservatives and flavorings and the like.

In the example set forth in the instant application, multiple structure function claims are provided. Upon the selection of an item from the ingredient, component or nutrient category and a related health issue, the system can generate any number of structure function claims, for example from 1 to 10, that are available and approved for use in communicating the benefit of such nutrient, component or ingredient.

Figure 3:
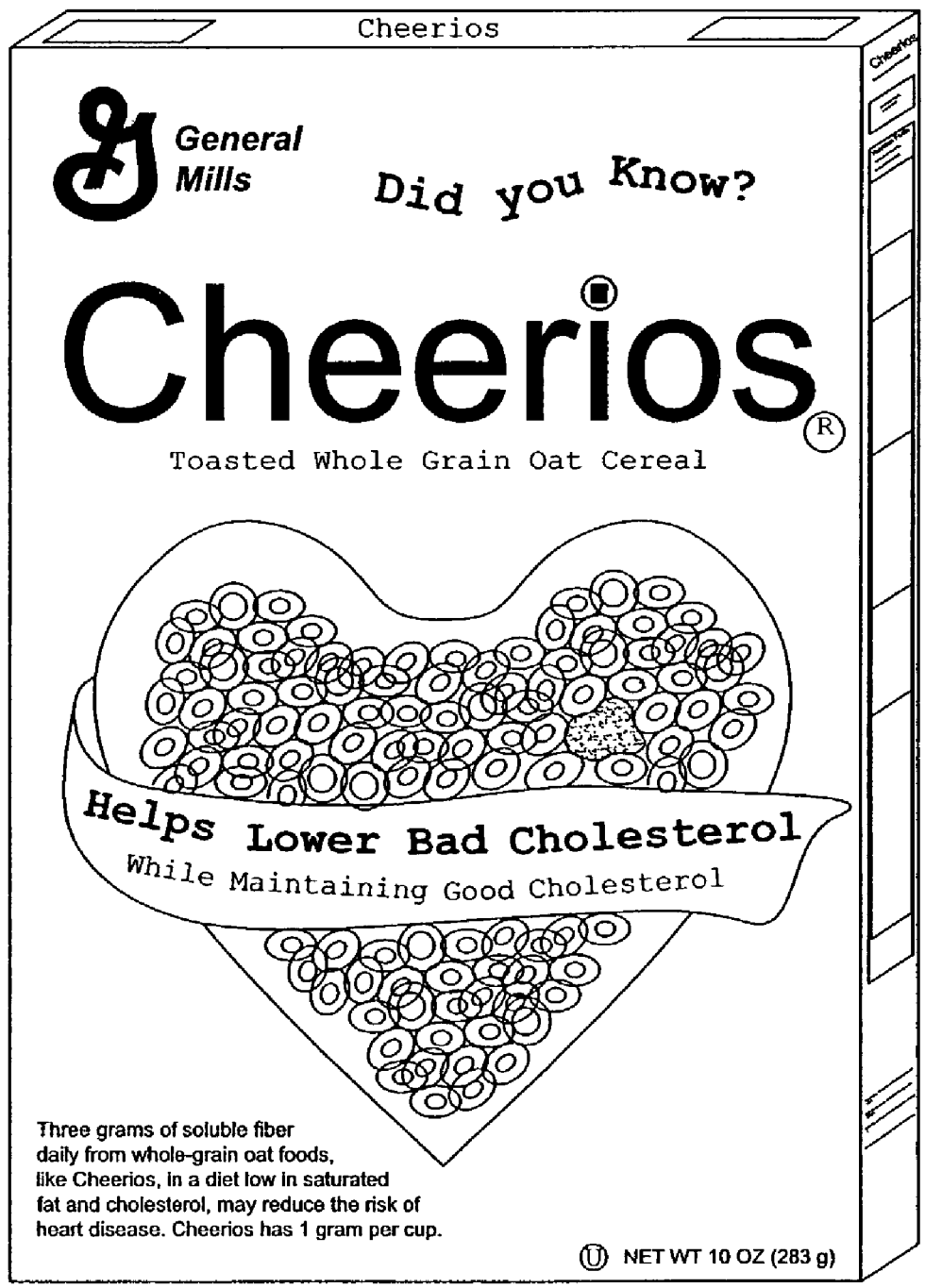
FIG. 3 is a representative illustration of packaging printed with structure function claims and the proper or approved placement of such claims.

Another function of the output portion 28, 30 and 42 of the system 10 (illustrated in FIGS. 1 and 2) is that the system 10 will also determine the positioning of the structure function claims on the packaging, advertising or other format in which the indicia is to appear. As illustrated in FIG. 3 the structure function claims are imaged directly on the packaging using conventional processes (flexographic, ink jet, offset lithography, electrostatic, etc.). The structure function claims can be printed or imaged on advertising materials by similar and known processes as set forth above.

Wording or indicia for such structure function claims is important from both a marketing perspective, and even more important from a regulatory view in order to protect consumers from over-reaching statements. Tracking of approved wording or indicia is quite cumbersome and leads to a host of logistical issues, particularly as packaging or advertising materials are headed to production and release to the wholesale and retail environments.

In addition, the system also can aid the user in a determination of the appropriate placements and sizing of the structure function claim to appear on the packaging. This information is drawn from another data set that can be part of an internal database or accessible through a remote database containing general information about printing such indicia.

This data set can also be used to determine product labeling requirements for the consumer food product.

Turning now to FIG. 4, which illustrates an exemplary output of the system of the present invention on a product package. In this example a number of components, nutrients and ingredients are entered into the input device 28 and a query is created to pull out the related health issues and structure function claims contained within data sets 14, 16 and 18. In addition in preparing to generate the output 42, additional data sets are queried, to provide information relating to the regulatory status of the nutrient, component or ingredient as well as whether the structure function claims are currently in use. The system will also provide the listing of the available research to support the structure function claim. In the interest of brevity, FIG. 4 merely provides the reference material in the abbreviated format of "ABC." However, in the actual data set, the reference information would contain clinical results, published reports, scholarly articles, doctorial thesis and other published information which supports and substantiates the structure function claim indicia.

Once the information is collected, as is shown in step 40 of FIG. 2, the user can select from the various ingredients, components or nutrients, which will make up some of the components of the finished product. As shown in FIG. 3, indicia of the structure function claim relating to Beta Glucan, a dietary fiber, is selected for imaging on the packaging and advertising of the consumer product, in this example a ready to eat ("RTE") cereal, marketed under the trademark CHEERIOS® available from General Mills, Inc., Minneapolis, Min. 55426.

FIGS. 3 and 4 are illustrative of the systems being used in connection with consumer food products, such as a ready to eat cereals, however, the invention is useable with a number of other products as well. There are ready to eat meals, or other ready to eat food products. RTE cereals and other meals may be grain based or may be produced from dough, such as breads, rolls and the like. The consumer product may be a dairy based or dairy type product, such as yogurt or yogurt beverage(s).

The system can also be used for sorting and providing structure function claims for use with the food service and bakeries business by providing advertising collateral or other indicia on menus to facilitate a choice by a potential consumer of various culinary selections.

While the embodiments and examples presented in this application have been directed at consumable food products, this in no event should be construed as a limitation on the scope of this invention. The system and method of the invention is also usable with other consumer goods, such as dietary and nutritional supplements, health care and beauty aids and food intended for animal consumption.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A system providing indicia for structure function claims, comprising;
   a database having at least first through third data sets, each of said data sets containing information that is distinct;
   said first data set containing a listing of items that include nutrients, components and ingredients, said items are formed together to create a nutrient, component and ingredient catalog, said nutrient, component and ingredient catalog including at least one macronutrient and at least one micronutrient;
   said second data set containing a listing of human health related issues;
   said third data set containing an approved grouping of structure function claims indicia relevant to each item in said nutrient, component and ingredient catalog and said listing of human health related issues;
   a first input module receiving data from at least one of said first, second and third data sets;
   a first output module displaying information received from said first, second and third data sets and said first input module; and
   means for producing an integrated message including a structure function claim linking at least one of the items from the first data set with at least one of the human health related issues from the second data set.

2. The system of claim 1, wherein said system is used in food product labeling.

3. The system of claim 2, wherein said food product is a ready to eat food product.

4. The system of claim 1, wherein said food product is a dairy type food product.

5. The system of claim 1, wherein said system is used in labeling health and beauty aids.

6. The system of claim 1, wherein said system is used in labeling dietary supplements.

7. The system of claim 1, wherein said system includes a fourth data set linking said listing of nutrients, components and ingredients to a classification.

8. The system of claim 1, wherein said system includes a fifth data set pertaining to regulatory status of said items in said catalog.

9. The system of claim 1, wherein said system includes a sixth data set supporting reference material for each item.

10. The system of claim 1, wherein said system includes information in a seventh data set relating to current use of said structure function claims.

11. The system of claim 10, wherein said current use of said structure function claims is in advertising.

12. The system of claim 10, wherein said current use of said structure function claims is in packaging.

13. The system of claim 1, wherein said system determines placement of said structure function claims on packaging.

14. The system of claim 1, wherein said system determines placement of said structure function claims on advertising.

15. A system controlling the production of structure function claims, comprising;
   a data network connected to at least a first database and a first input module and a first output module, said first database having first through third data sets, said system receiving information from at least one of said first through third data sets;
   said first data set having a listing of nutrients and components;
   said second data set having a grouping of human health related issues;
   said third data set having an arrangement of structure function claims that is related to said listing and said grouping; and
   wherein said system selects at least one of said human health related issues and at least one of said listing of nutrients and components related to said human health related issue and said system through said first output device generates a structure function claim relevant to said listing and said human health related issue.

16. A method providing indicia for structure function claims for food products, comprising the steps of;
  collecting a listing of items including nutrients, components and ingredients, said listing including at least one macronutrient and at least one micronutrient;
  storing said listing in a first data set of a first database;
  providing a grouping of human related health issues;
  storing said grouping in a second data set, distinct from said first data set;
  arranging approved structure function claims indicia in a third data set, said structure function claims being related to at least one item in said first data set and one human related health issue in said second data set;
  querying said first through third data sets to generate information useful in informing a consumer of a benefit of said one of said items in said listing; and
  printing an identification of at least one item of said listing, information about a human health related issue and structure function indicia indicating a beneficial relationship between consumption of said at least one item of said listing in maintenance of human health.

17. The method of claim 16, wherein the third data set includes information relating to placement of the structure function claim on packaging for the food product.

18. The method of claim 16, wherein the third data set includes information relating to placement of the structure function claim for advertising for the food product.

19. The method of claim 18, wherein the food product is ready to eat.

20. The method of claim 18, wherein the ready to eat food product is grain based.

21. The method of claim 18, wherein the ready to eat food product is a dairy type product.

* * * * *